United States Patent Office 3,666,501
Patented May 30, 1972

3,666,501
IMPROVED BLACK WATER-BORNE COATING
Gerald Wilton Barnett, High Wycombe, and John Leslie Inshaw, Great Missenden, England, assignors to Imperial Chemical Industries Limited, London, England
No Drawing. Filed Oct. 22, 1969, Ser. No. 868,605
Int. Cl. C09d 5/08, 1/00; C08h 17/24
U.S. Cl. 106—14                                            3 Claims

ABSTRACT OF THE DISCLOSURE

Method of improving water-borne coating composition for electrocoating having a black pigment and film-forming resin dispersed in water wherein the improvement consists essentially of a black pigment mixture of either a red or brown simple iron oxide pigment in combination with either a green or blue copper phthalo cyanine pigment.

---

This invention relates to coating compositions, in particular to water-borne coating compositions and to the use of such coating compositions in electrocoating processes.

It is known, for example from British patent specification No. 1,030,425, that water-borne paint compositions for use in electrocoating processes should have a pigment volume concentration which is low relative to those commonly used in coating compositions to be applied by older processes such as dipping and spraying. In the case of black coating compositions, carbon black is an obvious pigment to use because of its known effectiveness as a pigment at low pigment volume concentrations.

We have found, however, that water-borne coating compositions pigmented with carbon black tend to give rough finishes when applied by electrocoating processes, particularly when applied over zinc phosphate pretreated ferrous metal. This is believed to be due to the carbon black in some way causing the oxygen released at the cathodic article being electrocoated to form larger bubbles, these larger bubbles on reaching the surface of the applied film of coating composition leaving craters which are not adequately filled in by reflow of the coating film.

We have also found that smoother finishes can be obtained when the pigmentation in black water-borne coating compositions for use in electrocoating processes comprises a mixture of two complementary coloured pigments. Appropriate colours to use are well known from general principles of colour mixing.

Preferably at least one of the pigments is inorganic; in a preferred combination one of the pigments is a red or brown simple iron oxide pigment and the other is a green or blue copper phthalocyanine pigment. Such organic pigments are commercially available under the trade mark Monastral.

The relative proportions in which the two complementary pigments are used will depend on their tinctorial strength and the precise black hue required, the blacks possibly having brownish, bluish, greenish or other hues. The term "black" is used in this specification to mean a neutral colour of Munsell value not greater than 2, preferably not greater than 1, and a chroma not greater than 1, preferably not greater than 0.5.

Preferably the pigment volume concentration in the black coating composition is not greater than 20%.

In addition to the complementary pigments the coating composition may contain anti-corrosive pigments of low tinting strength, such as lead chromate and lead silico chromate.

The composition may also contain anti-settling agents such as bentonite and montmorillonite clays.

The resin used as the film-former in the composition may be selected from those suitable for use in electrocoating compositions, for example, epoxy esters, alkyd/phenolic and acrylic resins, maleinised oils and styrenated maleinised oils.

Typical combinations of pigments suitable for use in this invention are as follows, the figures indicating the volume concentration in the coating composition of the particular pigments and other additives used, expressed as a percentage of the total volume of non-volatile material in the composition:

| Comp. | Brown iron oxide | Red iron oxide | Monastral blue | Lead silico chromate | Bentonite |
|---|---|---|---|---|---|
| 1 | 2.38 | | 2.83 | 0.645 | 0.155 |
| 2 | 1.5 | | 2.83 | 0.645 | 0.155 |
| 3 | 3.23 | | 1.53 | | 0.13 |
| 4 | | 1.5 | 4.5 | | 0.1 |

These pigment combinations when dispersed in a carboxyl-group-containing epoxy ester, partially neutralised with potassium hydroxide, dispersed in water and applied to a zinc phosphated ferrous metal article by an electrocoating process, gave a smooth semi-glossy black coating.

Similar results were obtained when the epoxy ester was replaced by a carboxyl-containing alkyd/phenolic resin or acrylic resin.

We claim:
1. Method of improving a black water-borne coating composition for electrocoating having a black pigment and an electrocoatable film-forming resin dispersed in water, wherein the improvement consists essentially of a black pigment mixture of
   (a) a member of the group consisting of red and brown simple iron oxide pigments, and
   (b) a member of the group consisting of green and blue copper phthalocyanine pigments,
the black pigment volume concentration in the coating composition being not greater than 20%, said coating composition having a neutral color of Munsell value not greater than 2 and a chroma not greater than 1.
2. A method as claimed in claim 1 the colour of which is of Munsell value not greater than 1 and a chroma not greater than 0.5.
3. A method as claimed in claim 1 which also contains an anti-corrosive pigment of low tinting strength.

References Cited
UNITED STATES PATENTS
3,247,117   4/1966   Shoemaker et al. ___ 106—20 X
3,262,806   7/1966   Gourgè _____ 106—31 X JOAN B. EVANS, Primary Examiner U.S. Cl. X.R.
106—23, 211, 253, 259, 286, 287, 308; 117—132, 134; 148—6.1; 260—37 R, 37 P

UNITED STATES PATENT OFFICE
CERTIFICATE OF CORRECTION

Patent No. 3,666,501　　　　　　　　Dated May 30, 1972

Inventor(s) Gerald Wilton Barnett et al

It is certified that error appears in the above-identified patent and that said Letters Patent are hereby corrected as shown below:

In the heading to the printed specification, between lines 6 and 7 insert: -- Claims priority, application Great Britain, August 25, 1969, 42261/69 --.

Signed and sealed this 19th day of December 1972.

(SEAL)
Attest:

EDWARD M. FLETCHER, JR.　　　　　　　ROBERT GOTTSCHALK
Attesting Officer　　　　　　　　　　Commissioner of Patents